United States Patent
Haselden et al.

(10) Patent No.: US 7,536,406 B2
(45) Date of Patent: May 19, 2009

(54) IMPACT ANALYSIS IN AN OBJECT MODEL

(75) Inventors: J. Kirk Haselden, Issaquah, WA (US); Mark J. T. Durley, Sammamish, WA (US); Matthew E. David, Sammamish, WA (US); Sergei Ivanov, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 356 days.

(21) Appl. No.: 10/874,921

(22) Filed: Jun. 23, 2004

(65) Prior Publication Data

US 2005/0289167 A1     Dec. 29, 2005

(51) Int. Cl.
G06F 7/00 (2006.01)
G06F 17/00 (2006.01)

(52) U.S. Cl. ............... 707/102; 707/100; 707/101; 707/103 X; 707/103 Y; 717/162

(58) Field of Classification Search ............... 707/1–10, 707/100 S
See application file for complete search history.

(56) References Cited

U.S. PATENT DOCUMENTS

| | | | |
|---|---|---|---|
| 6,397,204 B1 | 5/2002 | Liu et al. | 707/2 |
| 6,427,230 B1 * | 7/2002 | Goiffon et al. | 717/108 |
| 6,493,720 B1 * | 12/2002 | Chu et al. | 707/104.1 |
| 2003/0120665 A1 | 6/2003 | Fox et al. | |
| 2004/0205452 A1 * | 10/2004 | Fitzsimons et al. | 715/500 |
| 2005/0015377 A1 * | 1/2005 | Wan | 707/10 |

OTHER PUBLICATIONS

Elisa Bertino et al. "Extending the ODMG Object Model with Composite Objects," ACM SIGPLAN conference on Object-oriented programming, systems, languages, and applications, vol. 33, Issue 10, Oct. 1998, pp. 259-270.*

Elisa Bertino, et al., "Extending the ODMG Object Model with Composite Objects," *ACM SIGPLAN Notices, Proceedings of the 13th ACM SIGPLAN conference on Object-oriented programming, systems, languages, and applications*, vol. 33, Issue 10, Oct. 1998, pp. 259-270.

John Cameron, "Configurable Development Processes—Keeping the focus on what is being produced," *Communications of the ACM*, vol. 45, Issue 3, Mar. 2002, pp. 72-77.

Karl Denninghoff, et al., "Database Method Schemas and Object Creation," *Proceedings of the Twelfth ADM SIGACT-SIGMOD-SIGART symposium on Principles of database systems*, Aug. 1993, pp. 265-275.

Theo Härder, et al., "the intrinsic problems of structural heterogeneity and an approach to their solution," *The VLDB Journal—The International Journal on Very Large Data Bases*, vol. 8, Issue 1, Apr. 1999, pp. 25-43.

(Continued)

*Primary Examiner*—John R. Cottingham
*Assistant Examiner*—Michael Pham
(74) *Attorney, Agent, or Firm*—Lee & Hayes, PLLC

(57) ABSTRACT

Impact analysis provides the ability to determine the objects that a particular object depends on or uses, as well as determine the objects that are dependent on or use a particular object. The term object may refer to tasks and/or object types, for example. Impact analysis is desirable for improving user productivity in large, complex documents because it facilitates determining how and where an object is used by other objects in the system, thereby potentially saving a great deal of manual work.

10 Claims, 7 Drawing Sheets

OTHER PUBLICATIONS

Ling Liu, et al., "The Distributed Interoperable Object Model and Its Application to large-scale Interoperable Database Systems," *Proceedings of the fourth international conference on Information and knowledge management*, Dec. 1995, pp. 105-112.

Christian Nentwich, et al., "Flexible Consistency Checking," *ACM Transactions on Software Engineering and Methodology (TOSEM)*, vol. 12, Issue 1, Jan. 2003, pp. 28-63.

George Spanoudakis, "Plausible and Adaptive Requirement Traceability Structures," *Proceedings of the 14th international conference on Software engineering and knowledge engineering*, Jul. 2002, pp. 135-142.

Deruelle, et al., "A Change Impact Analysis Approach For CORBA-Based Federated Databases", 2000, pp. 949-958.

Deruelle, et al., "Local and Federated Database Schemas Evolution, an Impact Propagation Model", 1999, pp. 902-911.

Metamatrix Inc., "MetaMatrix Feature Overview And Value Proposition, Version 4.1", Jun. 18, 2004, pp. 1-41.

Metamatrix Inc., "MetaMatrix MetaBase Modeler's Guide", Version 4.1, Jun. 11, 2004, pp. 1-308.

EP Search Report dated Nov. 8, 2007, relating to Application No. EP05105306.4.

* cited by examiner

TRACKING LIST FOR TASK1

<u>Connections</u>
src
- ID

<u>Variables</u>
- name
- type
- description

FIGURE 6

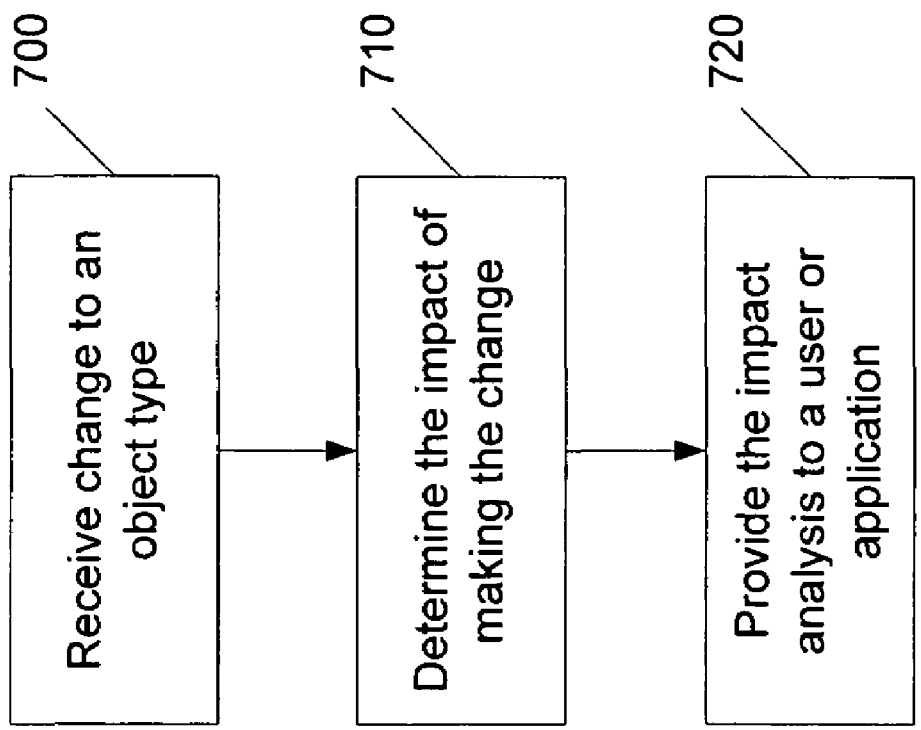

IMPACT ANALYSIS IN AN OBJECT MODEL

TECHNICAL FIELD

The present invention relates generally to the field of object models, and, more particularly, to analyzing the relationship between objects in a data structure or system.

BACKGROUND

Storage systems often arrange objects in a particular structure, such as a graph. Implicit dependencies exist between objects in the structure, such that a change to one object may change or otherwise impact other objects in the structure or the system as a whole. A problem exists in determining the impact that a change to an object will have on the structure or the system as a whole. The impact of a change is only apparent if the interaction between the objects in the structure is entirely based on locations of objects within the structure. This is often not the case, particularly when objects within the structure are comprised of executable code and thus may behave in an arbitrary fashion. There is a need for overcoming the difficulty of discovering impact of a change—impact analysis—in an environment where dependencies between objects are not readily apparent.

One type of storage system is a database management system. Data records in a relational database management system in a computer are maintained in tables, which are a collection of rows all having the same columns. Each column maintains information on a particular type of data for the data records that comprise the rows. One or more indexes may be associated with each table. An index is an ordered set of pointers to data records in the table based on the data in one or more columns of the table. In some cases, all the information needed by a query may be found in the index, making it unnecessary to search the actual table. An index is comprised of rows or index entries that include an index key and a pointer to a database record in the table having the key column values of the index entry key. An index key comprises key columns that provide an ordering to records in a table. The index key columns comprise the columns of the table, and may include any of the values that are possible for that particular column. Columns that are used frequently to access a table may be used as key columns.

A foreign key, also called a foreign keyword, in a database table is a key from another table that refers to (or targets) a specific key, usually the primary key, in the table being used. A primary key can be targeted by multiple foreign keys from other tables. But a primary key does not necessarily have to be the target of any foreign keys. It is possible to change the primary key in a table when the specific needs of the users change. For example, the people in a town might be uniquely identified according to their driver license numbers in one application, but in another situation it might be more convenient to identify them according to their telephone numbers. When the primary key in a table is changed, the set of associated foreign keys, if there are any, often changes as a result. The relationship between a foreign key and a primary key is easy to determine, and it is easy to understand how a change to a foreign key will impact a primary key, and vice versa.

Various object models have been defined that provide a standard interconnection mechanism between software components. Under these object models, software components are "objects" in the object-oriented sense, and the software components provide "interfaces" through which their functionality can be accessed. With respect to an object model, it is very difficult to determine the impact that a change to an object in the object model will have on the structure or the system as a whole.

Many organizations need to centralize data to improve corporate decision-making. However, their data may be stored in a variety of formats and in different locations. DTS addresses this need by providing a set of tools that allows the extraction, transformation, and consolidation of data from disparate sources into single or multiple destinations supported by DTS connectivity. By using DTS tools to graphically build DTS packages or by programming a package with the DTS object model, custom data movement solutions can be tailored as desired.

A DTS package is an organized collection of connections, DTS tasks, DTS transformations, variables, and workflow constraints assembled either with a DTS tool or programmatically to various cooperating computing applications or to structured storage files. Generally, each package contains one or more steps that are executed sequentially or in parallel when the package is run. When executed, the package connects to the correct data sources, copies data and database objects, transforms data, and notifies other users or processes of events. Packages can be edited, password protected, scheduled for execution, and retrieved by version, for example.

A user may typically build or edit a package piece by piece by adding various components one at a time and then testing the changes. Such a package may be arbitrarily complex, and it is difficult, if possible at all, to determine the impact that a change or update to a first object will have on a second object, without actually executing the program. This results in a cycle of trial-and-error to get the desired behavior.

From the foregoing, it is appreciated that there exists a need for systems and methods that overcome the prior art.

SUMMARY

The following summary provides an overview of various aspects of the invention. It is not intended to provide an exhaustive description of all of the important aspects of the invention, nor to define the scope of the invention. Rather, this summary is intended to serve as an introduction to the detailed description and figures that follow.

The invention relates to impact analysis, which provides the ability to determine the objects that a particular object depends on or uses, as well as determine the objects that are dependent on or use a particular object. The term object may refer to tasks and/or object types, for example. Impact analysis is desirable for improving user productivity in large, complex documents because it facilitates determining how and where an object is used by other objects in the system, thereby potentially saving a great deal of manual work.

An exemplary embodiment uses a reference tracker to allow the resource-using components (tasks) to declare which resources (object types) they use. In other words, the reference tracker notes the relation between the tasks and the object types, by creating a reference from the resource-using component to the resource to use. Links are then created between connections and tasks, and variables and tasks. The reference tracker populates a tracking list which is provided for each object type that is to be tracked for impact analysis. When an object assumes a dependency on (or uses) another object, it registers that dependency with the reference tracker, which adds a new entry to the tracking list. When that usage is changed or otherwise ended, the reference tracker is again notified and the corresponding entry is removed from the tracking list.

According to aspects of the invention, after the tracking list has been generated, a change to an object type may be received. The impact of making the change to the object is determined by referencing the tracking list to determine what other object types in the object model are registered as using it. This information is then returned to a user or application.

Other features and advantages of the invention may become apparent from the following detailed description of the invention and accompanying drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings:

FIG. 6 is a diagram of an exemplary tracking list in accordance with the present invention; and FIG. 7 is a flow diagram of another exemplary method in accordance with the present invention.

DETAILED DESCRIPTION

The subject matter is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the term "step" may be used herein to connote different elements of methods employed, the term should not be interpreted as implying any particular order among or between various steps herein disclosed unless and except when the order of individual steps is explicitly described.

Exemplary Computing Environment

Figure 1:
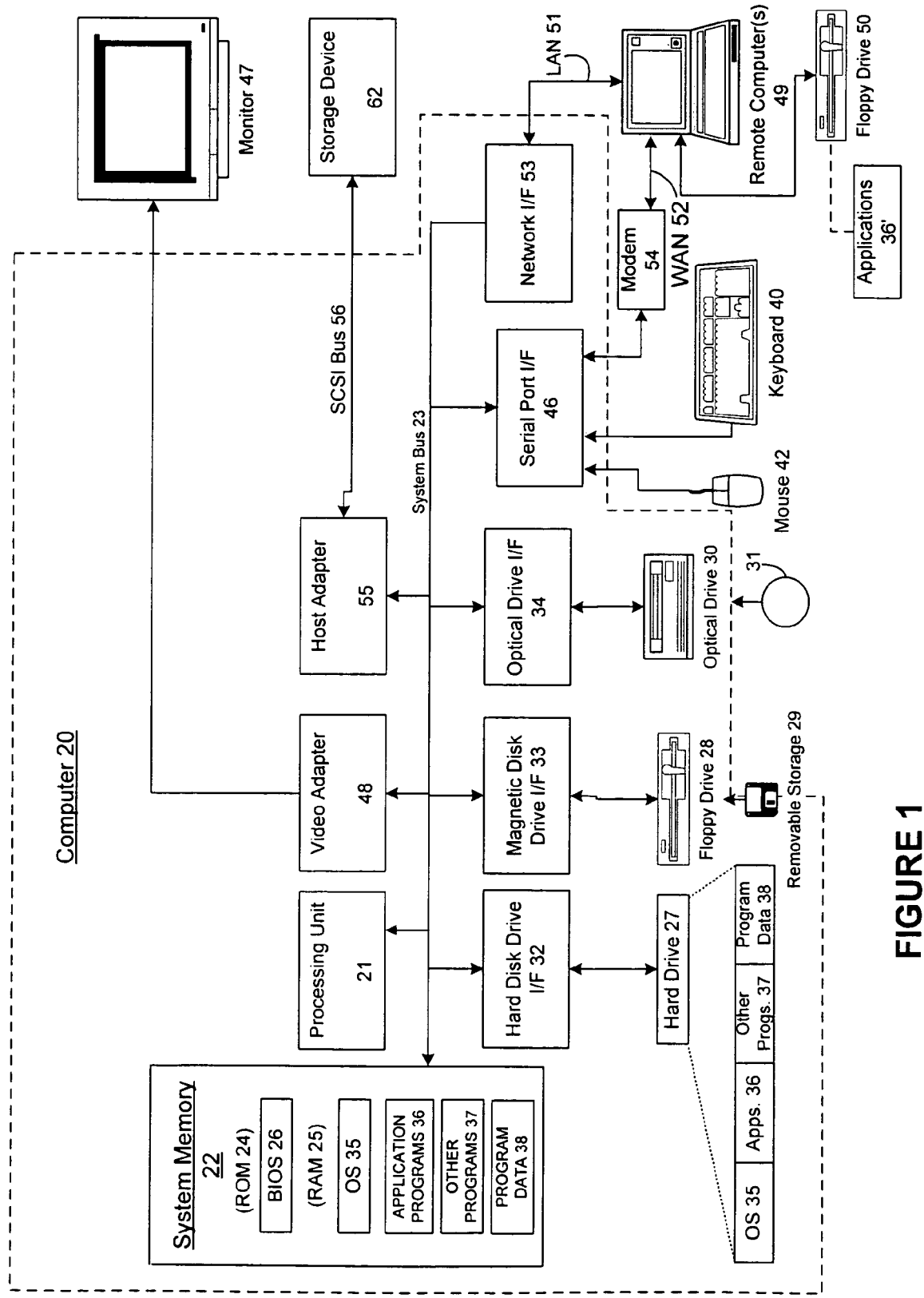
FIG. 1 is a block diagram representing a computer system in which aspects of the present invention may be incorporated.

Numerous embodiments of the present invention may execute on a computer. FIG. 1 and the following discussion are intended to provide a brief general description of a suitable computing environment in which the invention may be implemented. Although not required, the invention will be described in the general context of computer executable instructions, such as program modules, being executed by a computer, such as a client workstation or a server. Generally, program modules include routines, programs, objects, components, data structures and the like that perform particular tasks or implement particular abstract data types. An "object" is a unit of storable information accessible to a hardware/software interface system that has a basic set of properties that are commonly supported across all objects exposed to an end-user by the hardware/software interface system shell. Objects also have properties and relationships that are commonly supported across all types including features that allow new properties and relationships to be introduced.

Moreover, those skilled in the art will appreciate that the invention may be practiced with other computer system configurations, including handheld devices, multiprocessor systems, microprocessor based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 1, an exemplary general purpose computing system includes a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the personal computer 20, such as during start up, is stored in ROM 24.

The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer readable media provide nonvolatile storage of computer readable instructions, data structures, program modules and other data for the personal computer 20.

Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs) and the like may also be used in the exemplary operating environment.

A number of program modules may be stored on the hard disk, magnetic disk 29, optical disk 31, ROM 24 or RAM 25, including an operating system 35, one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite disk, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The exemplary system of FIG. 1 also includes a host adapter 55, Small Computer System Interface (SCSI) bus 56, and an external storage device 62 connected to the SCSI bus 56.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise wide computer networks, intranets and the Internet.

When used in a LAN networking environment, the personal computer 20 is connected to the LAN 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

While it is envisioned that numerous embodiments of the present invention are particularly well-suited for computerized systems, nothing in this document is intended to limit the invention to such embodiments. On the contrary, as used herein the term "computer system" is intended to encompass any and all devices comprising press buttons, or capable of determining button presses, or the equivalents of button presses, regardless of whether such devices are electronic, mechanical, logical, or virtual in nature.

Network Environment

Figure 2:
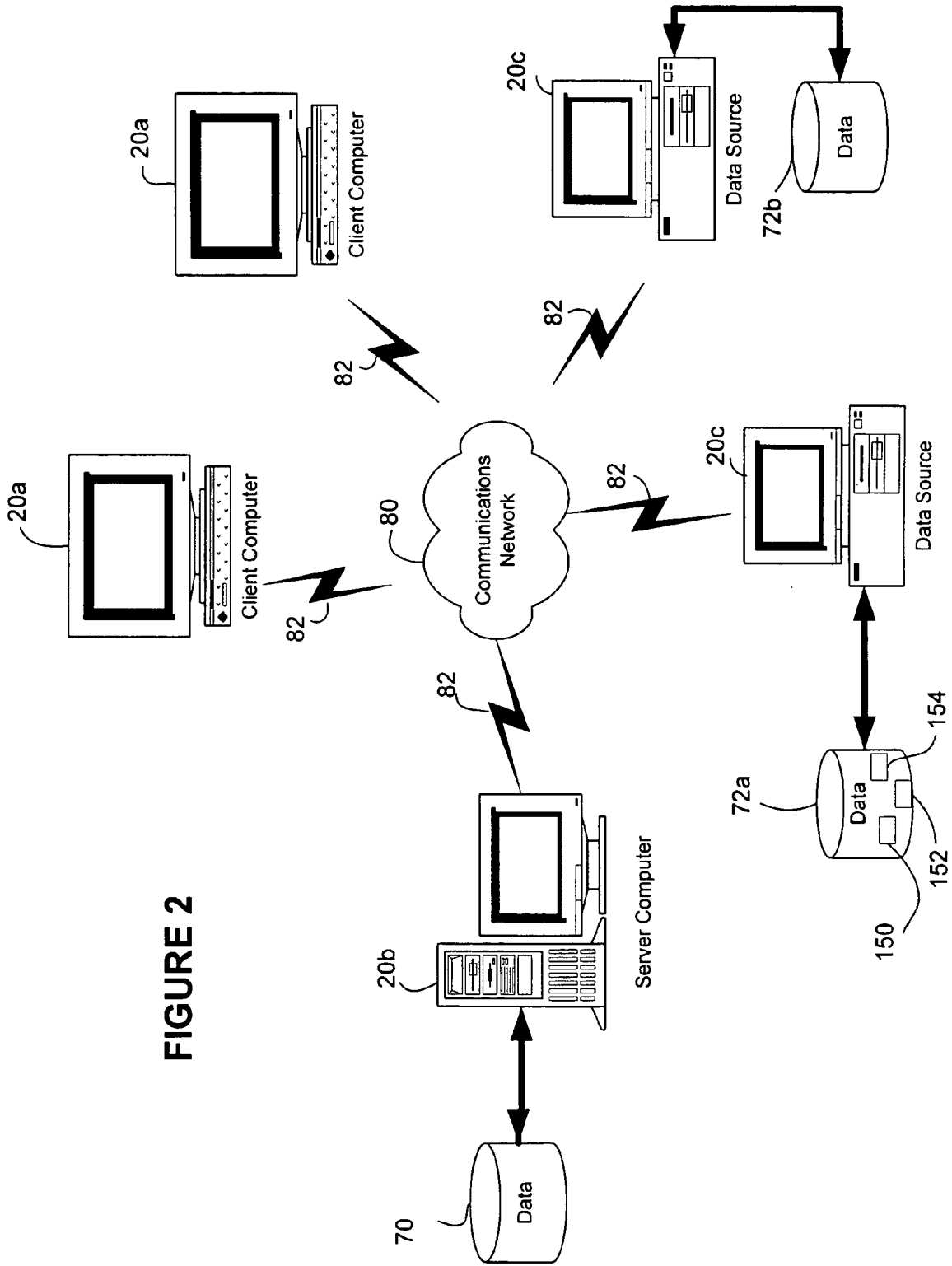
FIG. 2 is schematic diagram representing a network in which aspects of the present invention may be incorporated.

FIG. 2 illustrates an exemplary network environment in which the present invention may be employed. Of course, actual network and database environments can be arranged in a variety of configurations; however, the exemplary environment shown here provides a framework for understanding the type of environment in which the present invention may operate. Other environments are contemplated.

The network may include client computers 20a, a server computer 20b, data source computers 20c, and databases 70, 72a, and 72b. The client computers 20a and the data source computers 20c are in electronic communication with the server computer 20b via communications network 80, e.g., an Intranet. Client computers 20a and data source computers 20c are connected to the communications network by way of communications interfaces 82. Communications interfaces 82 can be any one of the well-known communications interfaces such as Ethernet connections, modem connections, and so on.

Server computer 20b provides management of database 70 by way of database server system software. As such, server 20b acts as a storehouse of data from a variety of data sources and provides that data to a variety of data consumers.

In the example of FIG. 2, data sources are provided by data source computers 20c. Data source computers 20c communicate data to server computer 20b via communications network 80, which may be a LAN, WAN, Intranet, Internet, or the like. Data source computers 20c store data locally in databases 72a, 72b, which may be relational database servers, spreadsheets, files, or the like. For example, database 72a shows data stored in tables 150, 152, and 154. The data provided by data sources 20c is combined and stored in a large database such as a data warehouse maintained by server 20b.

Client computers 20a that desire to use the data stored by server computer 20b can access the database 70 via communications network 80. Client computers 20a request the data by way of SQL queries (e.g., update, insert, and delete) on the data stored in database 70.

Database Architecture

A database is a collection of related data. In one type of database, a relational database, data is organized in a two-dimensional column and row form called a table. FIG. 2 illustrates tables such as tables 150, 152, and 154 that are stored in database 72a. A relational database typically includes multiple tables. A table may contain zero or more records and at least one field within each record. A record is a row in the table that is identified by a unique numeric called a record identifier. A field is a subdivision of a record to the extent that a column of data in the table represents the same field for each record in the table.

A database typically will also include associative structures. An example of an associative structure is an index, typically, but not necessarily, in a form of B-tree or hash index. An index provides for seeking to a specific row in a table with a near constant access time regardless of the size of the table. Associative structures are desirably transparent to users of a database and help provide efficient operation and control of the database management system. A database management system (DBMS), and in particular a relational database management system (RDBMS) is a control system that supports database features including, but not limited to, storing data on a memory medium, retrieving data from the memory medium, and updating data on the memory medium.

Generally, data stored in a relational database is accessed by way of a user-defined query that is constructed in a query language such as SQL. Typically, for any given SQL query there are numerous procedural operations that need be performed on the data in order to carry out the objectives of the SQL query. For example, there may be numerous joins and table scans that need to be performed so as to accomplish the desired objective.

Data Transformation Services and Data Transformation Pipeline

An exemplary data transformation services system (DTS) comprises a capability to receive data from a data source (such as a data retrieval system that receives data from a source), a data destination with a capability to store transformed and/or non-transformed data therein (a destination data storage system to store data), and a data transformation pipeline (DTP) that constructs complex end-to-end data transformation functionality (data flow executions or DFEs) by pipelining data flowing from one or more sources to one or more destinations through various interconnected nodes (that, when instantiated, become components in the pipeline) for transforming the data as it flows by (where the term transforming is used herein to broadly describe the universe of interactions that can be conducted to, with, by, or on data). Each component in the pipeline possesses specific predefined data transformation functionality, and the logical connections between components define the data flow pathway in an operational sense.

The data transformation pipeline (DTP) enables a user to develop complex end-to-end data transformation functionality (the DFEs) by graphically describing and representing, via a graphical user interface (GUI), a desired data flow from one or more sources to one or more destinations through various interconnected nodes (a graph). Each node in the graph selected by the user and incorporated in the graph represents specific predefined data transformation functionality (each a component), and connections between the nodes (the components) define the data flow pathway.

Figure 3:
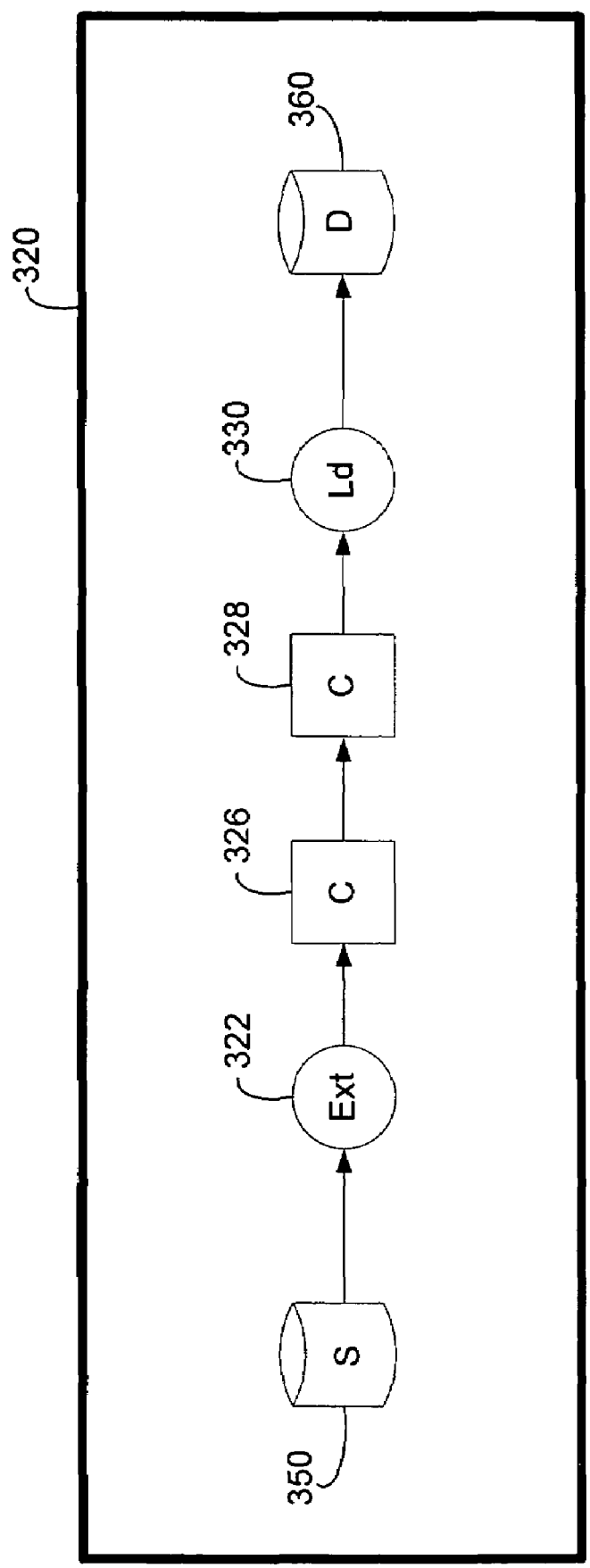
FIG. 3 is an illustration of an exemplary data flow execution useful for describing aspects of the present invention.

FIG. 3 is an illustration of an exemplary data flow execution between a source 350 and a destination 360 in a package 320. Elements 322, 326, 328, 330 refer to various operations in which data is manipulated. The source 350 receives data, e.g., from a file, a database, a website, etc. An extraction component 322 extracts data from the data source 350. A transformation component 326 transforms the data according to the input/output functionality of the component 326. A second transformation component 328 further manipulates the data according to its particular functionality. A loading component 330 then loads certain data onto the data destination 360. In this way, the development of complex data transforms is enabled.

Exemplary Embodiments

DTS is an exemplary computing environment having extensible components and communications within which the aspects of the invention may be implemented. Many organizations need to centralize data to improve corporate decision-making. However, their data may be stored in a variety of formats and in different locations. DTS addresses this by providing a set of tools that allows for the extraction, transformation, and consolidation of data from disparate sources into single or multiple destinations supported by DTS connectivity. By using DTS tools to graphically build DTS packages or by programming a package with the DTS object model, custom data movement solutions tailored to the specialized business needs of an organization may be created.

A DTS package is an organized collection of connections, DTS tasks, DTS transformations, and workflow constraints assembled either with a DTS tool or programmatically and saved to MICROSOFT® SQL Server™ or XML, for example. Generally, each package contains one or more steps that are executed sequentially or in parallel when the package is run. When executed, the package connects to the correct data sources, copies data and database objects, transforms data, and notifies other users or processes of events. Packages can be edited, password protected, scheduled for execution, and retrieved by version.

Along with DTS packages there exist DTS tasks. A DTS task is a discrete set of functionality, executed as a single step in a package. Each task defines a work item to be performed as part of the data movement and data transformation process, or as a job to be executed. Examples of commonly used DTS tasks include: 1) Importing and exporting data, 2) Transforming data, 3) Copying database objects, and 4) Sending and receiving messages to and from other users and packages. Completing the DTS components and operations is DTS transformation. A DTS transformation is one or more functions or operations applied against a piece of data before the data arrives at the destination.

Impact analysis provides the ability to determine the objects that a particular object depends on or uses, as well as determine the objects that are dependent on or use a particular object. As used herein, the term object may refer to tasks and/or object types, for example. Impact analysis is desirable for improving user productivity in large, complex documents because it facilitates determining how and where an object is used by other objects in the system, thereby potentially saving a great deal of manual work.

Exemplary object types include connections and variables, such as read-access variables and read/write-access variables. Although the exemplary embodiments are described herein with respect to connections and variables, it is contemplated that other object types can be used and tracked in accordance with the present invention. Such object types would desirably be tracked if it is determined that they could impact a package. The invention is desirably implemented in an object model, not a database. Accordingly, an extensible object model is provided, in which implicit relationships between objects are exposed in accordance with the invention.

Figure 4:
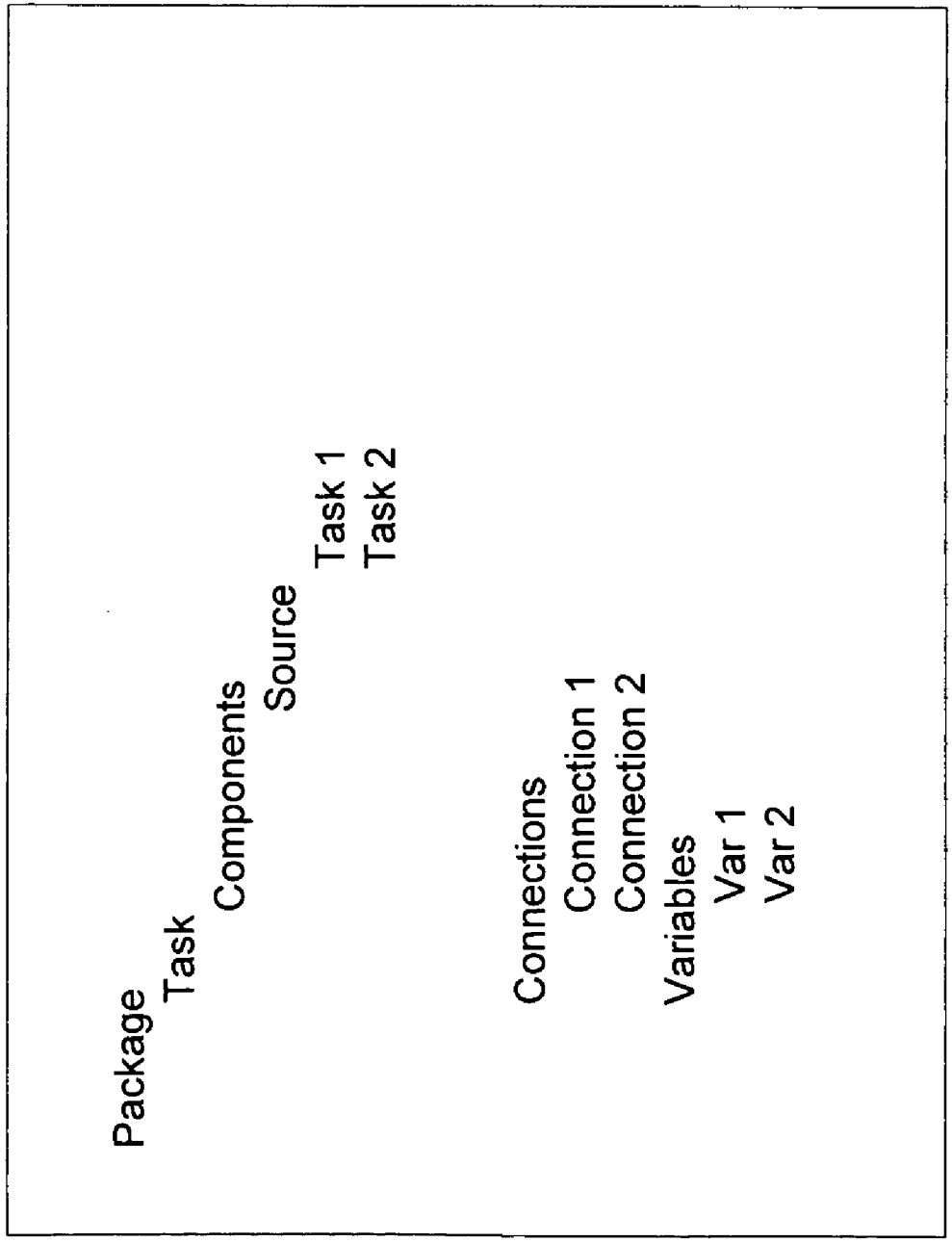
FIG. 4 is a diagram of an exemplary structure useful for describing aspects of the present invention.

In a package, as described above, a source receives data. The data is then manipulated prior to reaching its destination in the package. In accordance with the invention, a list of connections is provided that shows what packages are related to what. Put differently, a package comprises a task (with components) and object types. To create a package, for example, a user provides tasks and object types, via a user interface. The system then creates tree-like structures, such as that shown in FIG. 4. In the exemplary structure of FIG. 4, a package is shown that contains a task comprising components, one of which is a source that performs tasks 1 and 2. Connections 1 and 2, and variables 1 and 2, are shown as the object types. Such a tree-like structure may be used for developing a tracking list, as set forth below.

Figure 5:
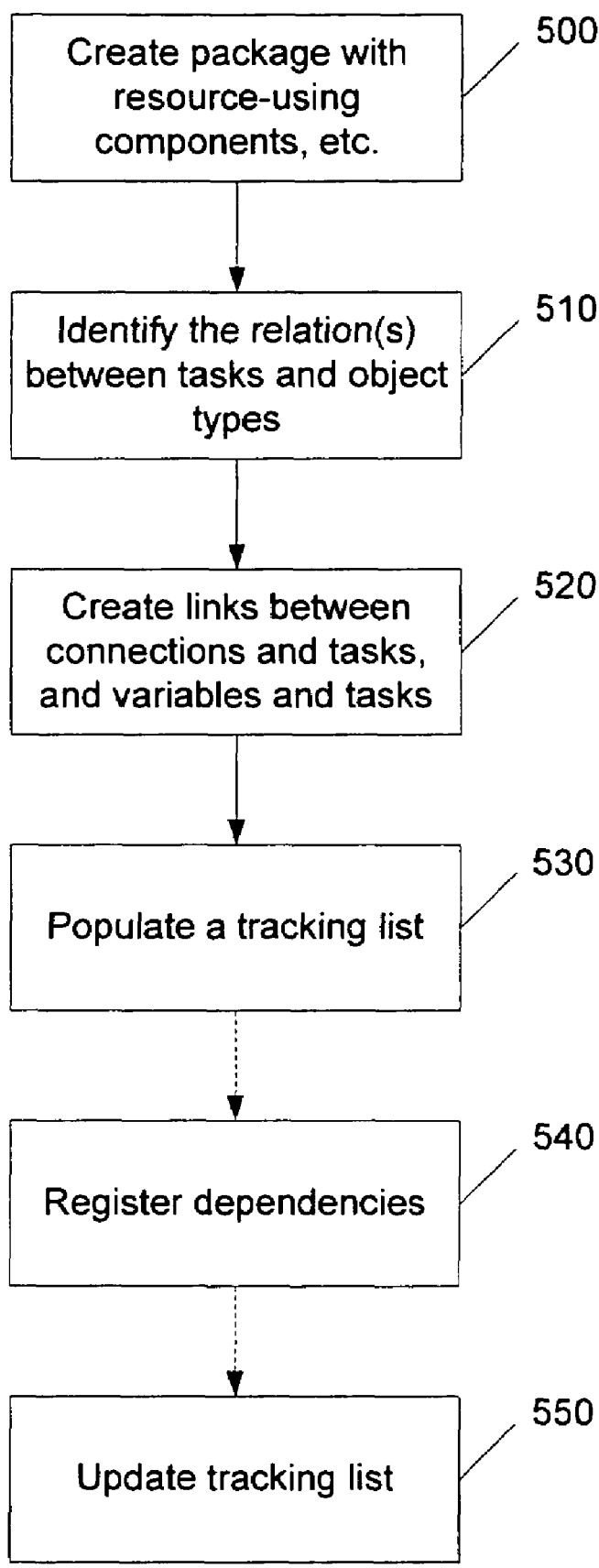
FIG. 5 is a flow diagram of an exemplary method in accordance with the present invention.

FIG. 5 shows a flow diagram of an exemplary method in accordance with the present invention. Initially, a package is created at step 500, with a resource-using component (e.g., a task) and an associated source for the resource-using component. A resource to use (e.g., an object type such as a connection or variable) is also described. A reference tracker is accessed at step 510 to allow the resource-using components (tasks) to declare which resources (object types) they use. In other words, the reference tracker notes the relation between the tasks and the object types, by creating a reference from the resource-using component to the resource to use. Links are then created between connections and tasks, and variables and tasks, at step 520.

The reference tracker populates a tracking list at step 530 which is provided for each object type that is to be tracked for impact analysis. When an object assumes a dependency on (or uses) another object, it registers that dependency with the reference tracker, which adds a new entry to the tracking list, at step 540. When that usage is changed or otherwise ended, the reference tracker is again notified and the corresponding entry is removed from the tracking list, at step 550.

An exemplary tracking list for an object type (e.g., TASK1) is shown in FIG. 6. Here, the tracking list provides a list of the connections that TASK1 depends on (or uses), and a list of the variables that TASK1 depends on (or uses). Each connection is preferably identified via a source identifier, and each variable is preferably identified via its name, type, and/or a description. A tracking list is desirably created in response to a task or component that uses variables and/or connections, or whatever object types are being monitored for impact analysis.

The tracking list is a relational structure that can be queried and reported on in variety of ways, e.g., for objects used by a particular object, for objects using a particular object, for all objects of a particular type, for objects using objects of a particular type, for objects used by objects of a particular type, etc. A history of the changes to the objects can be maintained by the tracking list. Generation of overview reports from this information is also contemplated.

Another exemplary method in accordance with the present invention is shown in the flow diagram of FIG. 7. After the tracking list has been generated (e.g., via the exemplary method described with respect to FIG. 5), a change to an object type may be received, at step 700. The impact of making the change to the object is determined at step 710, by referencing the tracking list to determine what other object types in the object model are registered as using it. This information is then returned to a user or application, at step 720.

For example, suppose TASK1 (from the exemplary tracking list shown in FIG. 6) is being deleted or otherwise changed, e.g., in an object model in a database. The tracking list is accessed to determine what will be impacted, and this information (the connections and variables in the tracking list for TASK1) is provided to the user or an application. Thus, in accordance with the invention, the impact of such a change to the object type is detected and may be reported or otherwise maintained. Desirably, the potential changes are determined and communicated prior to the changes being made.

In an exemplary embodiment, the IDTSObjectReference-Tracker interface is implemented. As described herein, the reference tracker is an extensible mechanism for impact analysis in the object model. Users of objects register what objects they are using and where. Then, for example, if the user attempts to delete an object, the system can verify that the object is not in use somewhere else, and if it is, display this information to the user. The user may also actively interrogate the tracking list in order to receive information about usage of a particular object in the object model.

A runtime task or pipeline component that uses variables or connections desirably creates a tracking list of these object types. It desirably provides a usage location and description for the list. For example, a task with a single variable could use its name as the location information, and a description of what the variable is used for as the usage description.

Tasks or components that make multiple different uses of variables or connections may create as many separate tracking lists as desired. For example, the "conditional split" component uses variables in expressions on outputs, and desirably creates a separate tracking list for each output expression that uses variables. It may set the component name as the usage location, and include the expression and where it is found in the description. That way, if the same variable is used in multiple expressions, each usage location will be tracked by the system.

Pipeline components desirably use a base class accessor, such as GetReferenceTracker( ) to get the interface. The design of the interface allows the system to be dynamically extended. That is, other programmers could create their own tasks or components and register with the same reference tracker, thereby granting them full participation in the impact analysis model. Now, if the third-party Task registers its use of variables and collections, it will desirably get notified when the user attempts to delete them.

A reference from a tracking list may be removed when that object is no longer being used or has been destroyed. The entire tracking list may by removed from the reference tracker system when, for example, the object that owns a list is being destroyed. The tracking list may also be removed when the object that owns the list is being refreshed, and a new list is being created. For example, in the "conditional split" transform, if the expression on an output is changed, the tracking list for that expression can be destroyed, and a new list can be created as the new expression is parsed.

Metadata for a tracking list can be provided. For example, usage location can be the name of the task or component that owns the list. Usage description can give a more detailed description of how the objects in the list are used. It is contemplated that usage location and usage description can be updated or changed as often as desired.

Conclusion

The various systems, methods, and techniques described herein may be implemented with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computer will generally include a processor, a storage medium readable by the processor (including volatile and non-volatile memory and/or storage elements), at least one input device, and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the invention. When implemented on a general-purpose processor, the program code combines with the processor to provide a unique apparatus that operates to perform the functionality of the present invention.

While the present invention has been described in connection with the preferred embodiments of the various figures, it is to be understood that other similar embodiments may be used or modifications and additions may be made to the described embodiments for performing the same functions of the present invention without deviating therefrom. Therefore, the present invention should not be limited to any single embodiment, but rather construed in breadth and scope in accordance with the appended claims.

What is claimed:

1. A data transformation service, comprising:
   a central processing unit; and
   memory accessible to the central processing unit, the memory including:
      a data retrieval system to receive data from a source of one or more sources;
      a data transformation pipeline that constructs complex end-to-end transformation functionality by pipelining data flowing from the one or more of the sources to one or more destinations, the data transformation pipeline comprising:
         a plurality of resource-using component objects;
         a graphical user interface which facilitates development of data transformation functionality, the graphical user interface representing a data transformation as a package represented as a series of interconnected nodes in a graph, wherein each node corresponds to a respective resource-using component object selected by the user from among the plurality of the resource-using components objects to be parts of the package, and when the parts of the package are executed the package transforms data according to an input/output functionality of the resource-using component objects which are included in the package;

an interpreter that traverses the graph and translates the graph into a data flow execution plan and at least one work list, said at least one work list comprising at least one work item; and a pipeline engine to build the data flow execution based on the data flow execution plan, said data flow execution plan comprising a set of components instantiated from the plurality of the resource-using component objects;

a reference tracker used by a pipeline component and operating in an object model, wherein the reference tracker:

determines a relation between a resource-using component object and a resource;

populates a tracking list, listing each resource that is to be tracked for an impact analysis, the tracking list including one or more resources used by the resource-using component object and one or more resources that the resource-using component object depends on;

receives notification from the resource-using component object after populating the tracking list that the resource-using component object assumed a dependency on an additional resource; and adds a new entry to the tracking list specifying the dependency of the resource-using component object on the additional resource in response to receiving the notification from the resource-using component object; and a program module executable by the central processing unit to determine the impact analysis indicating an impact of a statement to change a resource on one or more resource-using component objects;

a destination data storage system to store data, wherein the destination data storage system stores the impact analysis.

2. The data transformation service of claim 1, wherein the resource-using component is a task, and the resource is an object type.

3. The data transformation service of claim 2, wherein the object type is one of a read-access variable and a read/write-access variable.

4. The data transformation service of claim 1, wherein the tracking list exposes implicit relationships between objects.

5. A method of providing an impact analysis in a data transformation service, the method comprising:

receiving data at a computing system comprising memory and a central processor from a source of one or more sources, wherein the computing system is executing the data transformation service;

pipelining data flowing from the one or more sources to one or more destinations, the pipelining comprising:

receiving from a user, via a graphical user interface provided by the computing system, a selection of one or more resource-using component objects for inclusion in a package, when the one or more resource-using component objects are executed the package transforms data according to an input/output functionality of the one or more resource-using components objects which are included in the package;

displaying, via a monitor of the computer system, in response to the receiving of the selection, a graphical representation of a data transformation according to the package, wherein the package is represented as a series of interconnected nodes in a graph, wherein each node corresponds to a respective resource-using component object selected by the user to be part of the package;

traversing the graph and translating the graph at the computing system into a data flow execution plan and at least one work list, said at least one work list comprising at least one work item; and building a data flow execution at the computing system based on the data flow execution plan, said data flow execution plan comprising a set of components instantiated from the one or more resource-using component objects;

receiving a statement at the computing system to change a resource associated with a resource-using component object;

generating a plurality of tracking lists, at the computing system, wherein each tracking list lists each resource that is to be tracked for an impact analysis and includes a list of a plurality of resources associated with the resource-using component object, the plurality of resources including one or more variables, and each tracking list is related to a different use of a specified resource by the resource-using component object;

determining, at the computing system, the impact analysis indicating an impact of the statement of change on the resource-using component object;

wherein the impact analysis determines resources and resource-using components that the resource-using component object depends on or uses; and storing the impact analysis and providing the impact analysis to the user.

6. The method of claim 5, wherein the steps of generating the plurality of tracking lists, receiving from a user, and determining the impact analysis take place within an object model.

7. The method of claim 5, wherein the resource is an object type.

8. The method of claim 7, wherein the object type is one of a read-access variable and a read/write-access variable.

9. The method of claim 5, wherein the tracking list exposes implicit relationships between objects.

10. A computer storage medium containing computer executable instructions executed by a central processor to perform a method for evaluating an impact of a data transformation in a data transformation service, the method comprising:

receiving data from a source of one or more sources;

pipelining data flowing from the one or more sources to one or more destinations, the pipelining comprising:

receiving from a user, via a graphical user interface, a selection of one or more resource-using component objects for inclusion in a package, and when the one or more resource-using components are executed the package transforms data according to an input/output functionality of the one or more resource-using components objects which are included in the package;

displaying, by a hardware monitor, in response to the receiving of the selection, a graphical representation of a data transformation according to the package, wherein the package is represented as a series of interconnected nodes in a graph, wherein each node corresponds to a respective resource-using component object selected by the user to be part of the package;

traversing the graph and translating the graph into a data flow execution plan and at least one work list, said at least one work list comprising at least one work item; and building a data flow execution based on the data flow execution plan, said data flow execution plan comprising a set of components instantiated from the plurality of the one or more resource-using component objects;

receiving a statement to change a resource associated with a resource-using component object;

generating a plurality of tracking lists, wherein each tracking list lists each resource that is to be tracked for an impact analysis and includes a list of a plurality of resources associated with a resource-using component object, the plurality of resources including one or more variables, and each tracking list is related to a different use of a specified resource by the resource-using component object;

determining, the impact analysis indicating an impact of the statement of change on the resource-using component object;

wherein, the impact analysis determines resources and resource-using components that the resource-using component object depends on or uses; and storing the impact analysis and providing the impact analysis to the user.

* * * * *